United States Patent
Tsang et al.

(10) Patent No.: US 11,934,813 B2
(45) Date of Patent: Mar. 19, 2024

(54) FIXED POINT EARLY EXIT OF A LOOP WITHIN COMPUTER CODE

(71) Applicant: INTERNATIONAL BUSINESS MACHINES CORPORATION, Armonk, NY (US)

(72) Inventors: Wai Hung Tsang, Markham (CA); Ettore Tiotto, Whitby (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/456,426

(22) Filed: Nov. 24, 2021

(65) Prior Publication Data

US 2023/0161574 A1    May 25, 2023

(51) Int. Cl.
  *G06F 8/41* (2018.01)
(52) U.S. Cl.
  CPC ................... *G06F 8/4441* (2013.01)
(58) Field of Classification Search
  CPC ........... G06F 8/4441; G06F 8/41; G06F 8/443
  See application file for complete search history.

(56) References Cited

U.S. PATENT DOCUMENTS

| | | | | |
|---|---|---|---|---|
| 2004/0255284 A1* | 12/2004 | Kobayashi | ................ | G06F 8/41 717/106 |
| 2013/0304744 A1* | 11/2013 | McSherry | ........... | G06F 16/9024 707/752 |
| 2015/0067662 A1 | 3/2015 | Palalau | | |
| 2016/0179549 A1 | 6/2016 | Xekalakis et al. | | |
| 2016/0216966 A1 | 7/2016 | Dice et al. | | |
| 2016/0299748 A1* | 10/2016 | Scholz | ..................... | G06F 8/427 |
| 2018/0373869 A1* | 12/2018 | Jordan | .................. | G06F 21/563 |
| 2019/0026089 A1 | 1/2019 | Villarreal, Jr. | | |
| 2021/0157591 A1* | 5/2021 | Zbiciak | ................... | G06F 9/383 |

OTHER PUBLICATIONS

Qingrui Liu, "iDO: Compiler-Directed Failure Atomicity for Non-volatile Memory", 2018, 51st Annual IEEE/ACM International Symposium on Microarchitecture (Year: 2018).*

Dorit Nuzman, "Outer-Loop Vectorization—Revisited for Short SIMD Architectures", 2008, IBM Haifa Research Lab, Israel (Year: 2008).*

Craig Chambers, "Iterative type analysis and extended message splitting; optimizing dynamically-typed object-oriented programs," Jun. 1990, Proceedings of the ACM SIGPLAN 1990 conference on Programming language design and implementation, pp. 150-164 (Year: 1990).*

(Continued)

*Primary Examiner* — Qing Chen
*Assistant Examiner* — Amir Soltanzadeh
(74) *Attorney, Agent, or Firm* — Eric Chesley, Esq.; Blanche E. Schiller, Esq.; Heslin Rothenberg Farley & Mesiti P.C.

(57) ABSTRACT

Early exit of a loop is performed. A determination is made as to whether a loop within computer code reaches a fixed point of processing, which is predefined. Based on determining that the loop reaches the fixed point of processing, at least one indication is included in the loop to perform an early exit of the loop prior to a last iteration of the loop.

20 Claims, 6 Drawing Sheets

(56) References Cited

OTHER PUBLICATIONS

Grace Period Disclosure: IBM® Open XL C/C++ Compiler, Sep. 2021, (7 pages), https://www.ibm.com/products/xl-cpp-aix-compiler-power.
Grace Period Disclosure: IBM® Open XL Fortran Compiler, Sep. 2021, (6 pages), https://www.ibm.com/products/xl-fortran-aix-compiler-power.
Transmittal Letter Regarding Confidential Activity, Dec. 14, 2021, (1 page).
IBM, "z/Architecture—Principles of Operation," IBM Publication No. SA22-7832-12, Thirteenth Edition, Sep. 2019, pp. 1-2000.
Mell, Peter and Tim Grance, "The NIST Definition of Cloud Computing," National Institute of Standards and Technology, Information Technology Laboratory, Special Publication 800-145, Sep. 2011, pp. 1-7.

* cited by examiner

FIXED POINT EARLY EXIT OF A LOOP WITHIN COMPUTER CODE

STATEMENT REGARDING PRIOR DISCLOSURES

The following disclosure(s) are submitted under 35 U.S.C. 102(b)(1)(A):

DISCLOSURE(S): IBM® Open XL C/C++ Compiler, September 2021: and IBM® Open XL Fortran Compiler, September 2021.

BACKGROUND

One or more aspects relate, in general, to processing within a computing environment, and in particular, to facilitating such processing.

Processing within a computing environment includes executing computer programs that perform various tasks. Programs are typically written in a program code, referred to as source code, which is not understood by a machine, such as a computer. However, the source code is translated to machine code, referred to as machine language, which is understandable by a computer. This translation may be performed using a compiler. There are many available compilers, and different compilers offer different features. One feature that is offered is an optimization feature in which one or more optimizations are applied to the program to enhance program performance.

For example, compiler optimization techniques have been developed to enable loops within a program to execute faster. This is beneficial since most execution time of certain programs, such as scientific programs, is spent on loops within the programs.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes determining whether a loop within computer code reaches a fixed point of processing, the fixed point of processing being predefined. Based on determining that the loop reaches the fixed point of processing, at least one indication is included in the loop to perform an early exit of the loop prior to a last iteration of the loop.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In one or more aspects, a capability is provided to facilitate processing within a computing environment. For instance, processing associated with computer code that includes one or more loops is facilitated by providing an optimization that includes an early exit of certain loops. By exiting a loop early and preventing further iterations, loop execution may be faster, improving performance.

Figure 1:
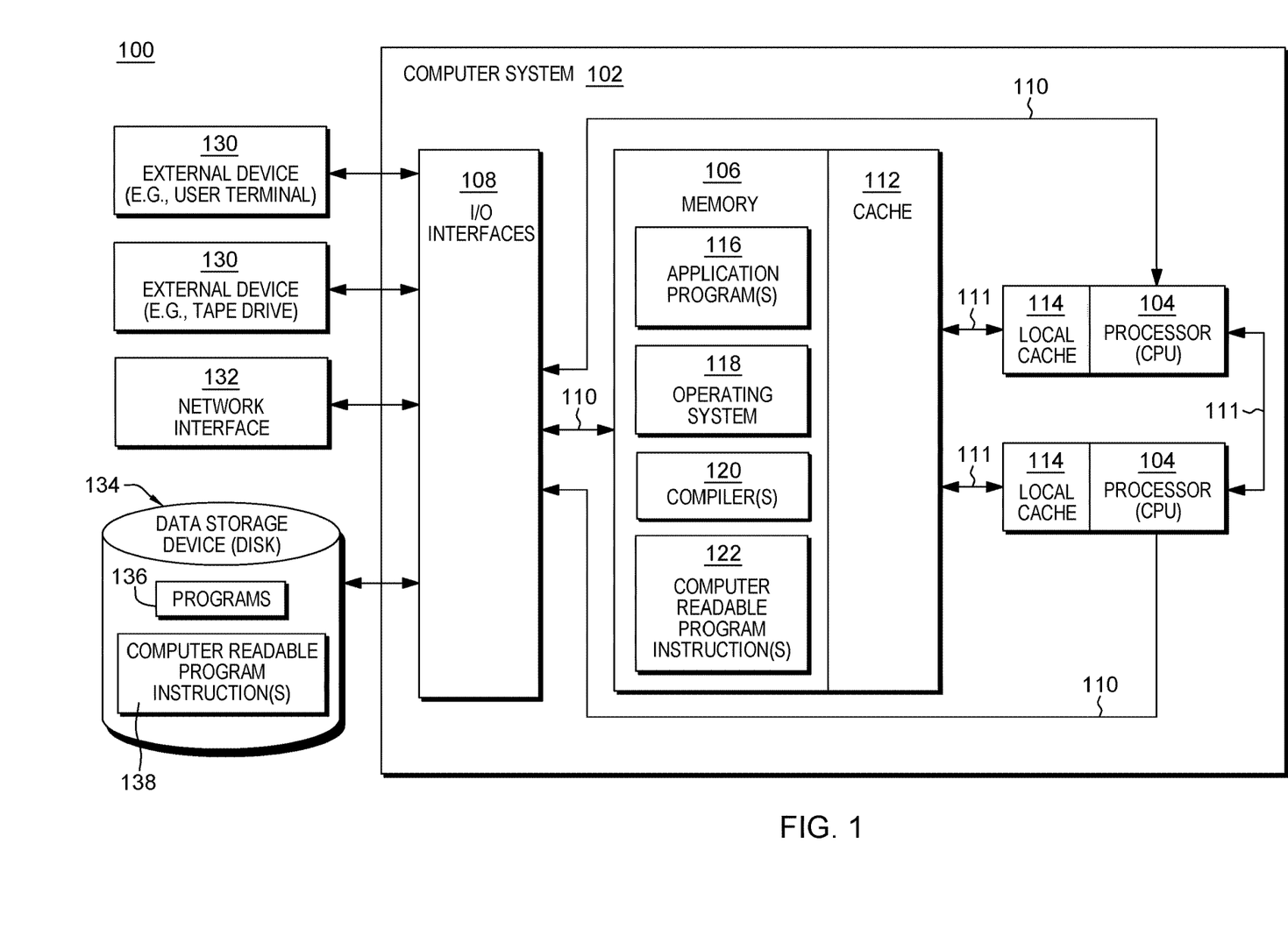
FIG. 1 depicts one example of a computing environment to include and/or use one or more aspects of the present invention.

In one aspect, the optimization is performed by e.g., a processor, and in one example, by a compiler executing on a processor. One example of a computing environment executing such a processor is described with reference to FIG. 1. As an example, the computing environment of FIG. 1 is based on the IBM® Power® instruction set architecture offered by International Business Machines Corporation, Armonk, N.Y. However, the Power instruction set architecture is only one instruction set architecture to be used; other instruction set architectures offered by International Business Machines Corporation and/or other corporations, entities, etc. may be used. IBM and Power are registered trademarks or trademarks of International Business Machines Corporation in at least one jurisdiction.

Referring to FIG. 1, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, one or more compilers 120 and one or more computer readable program instructions 122. Computer readable program instructions 122 may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As described herein, in one aspect, a compiler (e.g., compiler 120) of a processor (e.g., processor 104) inserts a set of early exits into a loop within computer code (e.g., computer program, application, module, etc.) to terminate the loop prior to a last iteration of the loop (referred to herein as early exit). In one example, static compiler analysis is performed and based thereon, code transformation is performed in which a set of early exits (e.g., one or more indications used to exit early) is inserted into the loop to terminate the loop based on the loop reaching a fixed point of processing. As an example, the fixed point of processing is predefined and includes, for instance, side effects of the loop are realized (i.e., there are no or no more side effects) and/or live-out variables of the loop are not overwritten with a different value, for instance, as a variable that holds a value that may be used in future processing. A side effect is defined, for instance, as modifying a global variable outside of its local environment.

In one example, a loop can be terminated before the last iteration 'Li' if there exists an iteration I (where I<Li) after which no further side effects are observable and live-out variables are not overwritten with different values. That is, such a loop reaches a fixed point of processing, in which after iteration 'I': there are no instructions in the loop that potentially have a side effect (e.g., there are no calls to functions that might create a side effect (e.g., printf)), and live-out variables are not overwritten with a different value.

As an example, consider the following loop (referred to herein as Example Loop):

```
unsigned x=0;
for (int i=0; i<N; ++i)
   if (A[i])
      x=1; // used after the loop (i.e., live-out)
```

If A[i] is true, the loop reaches a fixed point, because the value assigned to variable x can no longer be changed in subsequent loop iterations. In one example, this type of loop can be exited, for instance, immediately after variable x is updated, as shown below:

```
unsigned x=0;
for (int i=0; i<N; +i)
   if (A[i]) {
      x=1;
      break; // early exit
   }
```

In accordance with one or more aspects of the present invention, a set of early exits is inserted (e.g., via a compiler) into a loop to terminate the loop based on reaching a fixed point of processing within the loop (e.g., as soon as all side effects are realized and/or the live-out variables are not overwritten with different values). This increases performance by eliminating iterations that are not needed.

One example of inserting early exits is described with reference to FIG. 2. As an example, this processing is implemented in a compiler (e.g., compiler 120). One example compiler is the LLVM compiler, but one or more aspects of the present invention may be implemented and/or used by other compilers.

Figure 2:
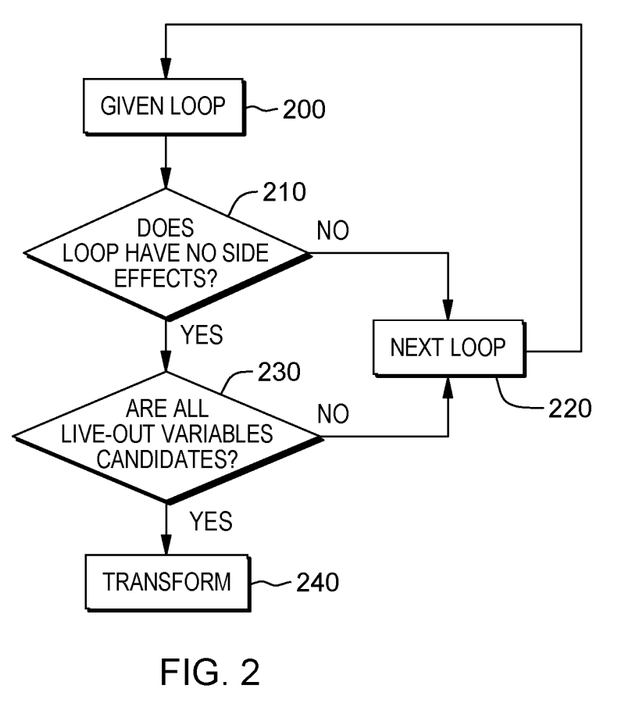
FIG. 2 depicts one example of selecting loops for early exit transformation, in accordance with one or more aspects of the present invention.

Referring to FIG. 2, given a candidate loop 200, the analysis checks whether the loop might have global side effects (e.g., one or more instructions in the loop that potentially have one or more side effects; calls to printf or another function that updates a global variable, etc.) 210. If there are side effects, the loop is not a candidate for early exit transformation, and processing continues to a next loop, if any, 220. However, if the loop does not have side effects, the analysis determines whether the (e.g., all) live-out variables are valid candidates for early exit transformation 230, as described below. If the live-out variables are not candidates, processing continues to the next loop, if any, 220. Otherwise, the loop is transformed by adding in a set of early exits 240, in accordance with one or more aspects.

Figure 3:
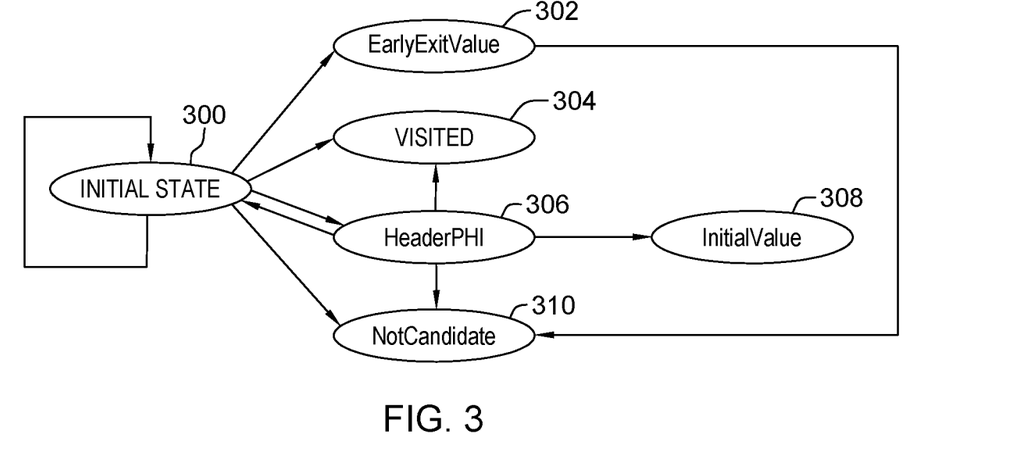
FIG. 3 depicts one example of a state diagram to be used to determine if a live-out variable is a candidate for early exit transformation of the corresponding loop, in accordance with one or more aspects of the present invention.

One embodiment of determining whether a live-out variable is a candidate for early exit optimization is described with reference to the state diagram depicted in FIG. 3. In one example, the state diagram and/or processing associated therewith is implemented in a compiler (e.g., compiler 120). One example compiler is the LLVM compiler, but one or more aspects of the present invention may be implemented and/or used by other compilers.

In one example, in LLVM intermediate representation (IR), loops are in, for instance, a loop closed SSA (static single assignment) form. As such, in one example, the live-out variables are represented as PHINodes. A live-out variable starts out in the initial state 300, and state transitions are executed as follows, in one example:

If the PHINode incoming value is loop invariant (e.g., a value defined in the loop pre-header), the state transitions from initial state 300 to, e.g., an EarlyExitValue state 302. The PHINode incoming value is recorded as an EarlyExitValue, and its corresponding incoming block is recorded as an EarlyExitBlock.

In the EarlyExitValue state 302, a comparison is performed of the current value of the EarlyExitBlock with the previous stored one, if it exists. If the two values are different, the state transitions from EarlyExitValue state 302 to, e.g., a NotCandidate state 310 and the analysis terminates.

Otherwise, if the incoming value has already been visited, the state transitions from initial state 300 to Visited state 304 and the analysis continues to the next incoming value.

Otherwise, if the incoming value is a PHINode defined in the loop header basic block, the state transitions from initial state 300 to, e.g., a HeaderPHI state 306 and its incoming values are analyzed.

If the incoming value of the Header PHINode is a loop invariant value, the state transitions from HeaderPhi 306 to, e.g., an InitialValue state 308 and the loop invariant value is recorded.

Otherwise, if the incoming value is not loop invariant, and is not a PHINode or a SelectInst (Select instruction), the state transitions from initial state 300 to, e.g., the NotCandidate state 310 and the analysis terminates.

If the incoming value is a PHINode or SelectInst, which is not already visited and not in the loop header, it remains in initial state 300. Its incoming values are analyzed, and the analysis continues.

Otherwise, if the incoming value has been already visited, the state transitions to Visited state 304 and the analysis continues to the next incoming value.

If the incoming value is a PHINode or SelectInst, which is not already visited and not in the loop header, it transitions from, e.g., a HeaderPHI state 306 to initial state 300. Its incoming values are analyzed, and the analysis continues.

Otherwise, if the incoming value is not loop invariant, and is not a PHINode or a SelectInst, the state transitions from HeaderPHI state 306 to the NotCandidate state 310 and the analysis terminates.

The analysis allows a determination of whether the given live-out variable is a candidate to allow for loop transformation (that is, the NotCandidate state was not reached). Moreover, as a result of the analysis, the initial value, the single EarlyExitValue, and the EarlyExitBlocks for that live-out variable are collected and used to transform the loop, in one example.

One example of the LLVM intermediate representation corresponding to the Example Loop is shown below, in which a compare instruction is used with a PHINode:

```
1    for.body
2       %i = phi i64 [ 0, %for.preheader ], [ %inc, %for.inc ]
3       %x = phi i32 [ 0, %for.preheader ], [ %x.1, %for.inc ]
4       %arrayidx = getelementptr inbounds i1, i1* %A, i64 %i
5       %0 = load i1, i1* %arrayidx, align 1
6       br i1 %0, label %if.then, label%if.end
7
8    if.then:
9       br label %if.end
10
11   if.end:
12       %x.1 = phi i32 [ 1, %if.then ], [ %x, %for.body ]
13       br label %for.inc
14
15   for.inc:
16       %inc = add nsw i64 %i, 1
17       %cmp = icmp slt i64 %inc, %N
18       br i1 %cmp, label %for.body, label %for.exit
19
20   for.exit:
21       %lcssa = phi i32 [ %x.1, %for.inc ]
22       br label %for.end
```

Figure 4:
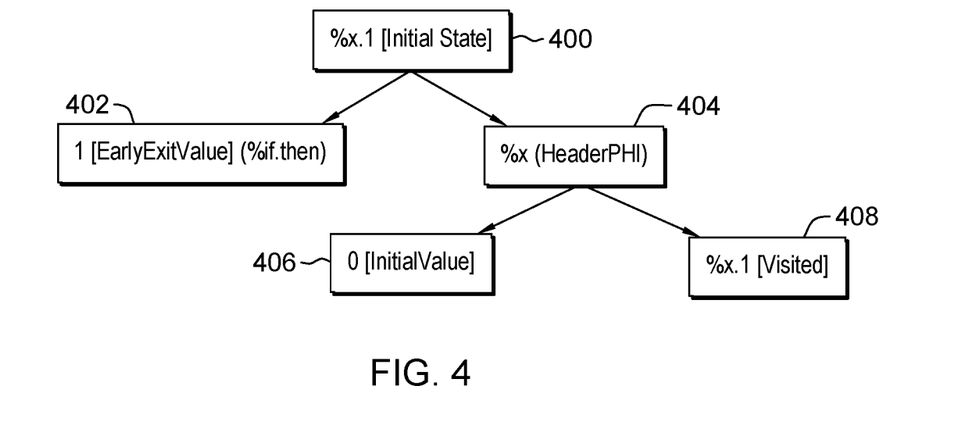
FIG. 4 depicts one example of a processing state diagram used in accordance with one or more aspects of the present invention.

Referring to the above intermediate representation and FIG. 4, one example of how the analysis operates on the Example Loop, referred to above, is illustrated. In one example, this loop includes a live-out variable % lcssa (e.g., at line 21). The live-out variable has a single incoming value % x.1 which is placed in the initial state 400. Because % x.1 (e.g., at line 12) is a PHINode, its incoming values are examined, which are the constant 1 and the variable % x. It is recorded that the constant 1 is the EarlyExitValue 402 (as it is trivially loop invariant), and analysis of the other incoming value % x at line 3 continues. This variable is defined in the loop header as a PHINode, and it is recorded as the potential HeaderPHI 404 and its incoming values (0 and % x.1) are analyzed. The constant 0 is recorded as the InitialValue 406 and % x.1 is recorded as a Visited variable 408. The analysis succeeds because the NotCandidate state is not reached. In summary, the analysis classifies % lcssa as, e.g., a valid live-out variable with EarlyExitValue=1, EarlyExitBlock=% if.then and InitialValue=0.

In one example, the loop optimization includes the information to be used to transform the loop. An example of an intermediate representation of the Example Loop after early exit transformation is as follows:

```
1    for.body
2       %i = phi i64 [ 0, %for.preheader ], [ %inc, %for.inc ]
3       %x = phi i32 [ 0, %for.preheader ], [ %x. 1, %for.inc ]
4       %arrayidx = getelementptr inbounds i1, i1* %A, i64 %i
5       %0 = load i1, i1* %arrayidx, align 1
6       br i1 %0, label %if.then, label %if.end
7
8    if.then:
```

```
 9          ;br label %if.end
10          br label %for.exit; (1: modified termination to inject early exit branch)
11
12      if.end:
13          ; %x.1 = phi i32 [ 1, %if.then ], [ %x, %for.body ]
14          %x.1 = phi i32 [ 0, %for.body ]; (2: replace %x with initial value)
15          br label %for.inc
16
17      for.inc:
18          %inc = add nsw i64 %i, 1
19          %cmp = icmp slt i64 %inc, %N
20          br i1 %cmp, label %for.body, label %for.exit
21
22      for.exit:
23          ; %lcssa = phi i32 [ %x. 1, %for.inc ]
24          %lcssa = phi i32 [ %x. 1, %for.inc ], [ 1, %if.then ]; (3: add exit value)
25          br label %for.end
```

Referring to the above example LLVM intermediate representation of the Example Loop after early exit transformation, the transformation to provide early exit includes, for instance:

Change the termination instruction in the EarlyExitBlock (e.g., % if.then) to an unconditional branch to the loop exit block (e.g., % for.exit) at line 10 from line 9.

Replace uses of variable % x inside the loop with its InitialValue (e.g., 0), collapsing PHINodes where possible.

Add a new incoming value to the % lcssa PHINode in the loop exit block % for.exit containing the EarlyExitValue (e.g., 1) and EarlyExitBlock (e.g., % if.then) at line 24 from line 23.

Although examples are provided above to transform a loop to include an early exit, other examples and/or variations may be provided and/or used.

In addition to the above, in another example, a Select instruction may be used. One example of LLVM intermediate representation of the Example Loop using a select instruction is depicted below:

```
for.body:
    %i = phi i64 [ %inc, %for.body ], [ 0, %for. preheader ]
    %x = phi i32 [ %select, %for.body ], [ 0, %for.preheader ]
    %arrayidx = getelementptr inbounds i1, i1* %A, i64 %i
    %0 = load i1, i1* %arrayidx, align 1%
    select = select i1 %0, i32 1, i32 %x
    %inc = add nsw i64 %i, 1
    %cmp = icmp slt i64 %inc,
    br i1 %cmp, label %for.body, label %for.exit
for.exit:
    %lcssa = phi i32 [ %select, %for.body ]
    br label %for.end
```

Further, one example of LLVM intermediate representation for the Example Loop after early exit transformation using a Select instruction is depicted below:

```
for.body:
    %i = phi i64 [ %inc, %for.body ], [ 0, %for.preheader ]
    %arrayidx = getelementptr inbounds i1, i1* %A, i64 %i
    %0 = load i1, i1* %arrayidx, align 1
    br i1 %0, label %for.exit, label %if.end
if.end:
    %select = select i1 %0, i32 1, i32 0
    %inc = add nsw i64 %i, 1
    %cmp = icmp slt i64 %inc, %N
    br i1 %cmp, label %for.body, label %for.exit
for.exit:
```

```
    %lcssa = phi i32 [ %select, % if end ], [ 1, %for.body ]
    br label %for.end
```

In accordance with one or more aspects, a fixed point early exit transformation of a loop is provided. As an example, a static compiler analysis and associated code transformation are performed which insert a set of early exits into a loop to terminate the loop, e.g., as soon as all side effects are realized and/or live-out variables are considered candidates for transformation. As an example, based on receiving a candidate loop, a determination is made using, e.g., static analysis by a compiler whether the candidate loop has observable (or unrealized) side effects. Based on a determination that the candidate loop has observable (or unrealized) side effects, the loop is identified as not a candidate for transformation. Further, in one example, based on a determination that the candidate loop has no observable (or unrealized) side effects, a determination is made as to whether all live-out variables are valid candidates. Based on a determination that all live-out variables are valid candidates, the candidate loop is transformed to terminate the candidate loop by, e.g.: changing a termination instruction in an EarlyExitBlock of the candidate loop to an unconditional branch to the candidate loop exit block; replacing uses of an identified variable inside the candidate loop with a respective InitialValue (e.g., 0); and adding a new incoming value to the live-out variable in the candidate loop exit block containing an EarlyExitValue (e.g., 1) and the EarlyExitBlock. Other examples and/or variations are possible.

One or more aspects of the present invention are inextricably tied to computer technology and facilitate processing within a computer, improving performance thereof. The use of a process to insert early exits in a loop that contains control flow, when, e.g., an unoptimized version of the loop does not have early exits, reduces the number of loop iterations to be executed by the loop, allowing the loop to run faster and improve performance.

In a further embodiment, if the compiler has access to loop description information, the compiler may make use of it to further refine loop early exit optimization decisions. For example, description information could be used to reverse the loop iteration space if the early exit point is closer to the end of the array. Other optimizations are possible.

Although embodiments are described herein, other variations and/or embodiments are possible.

Figure 5A:
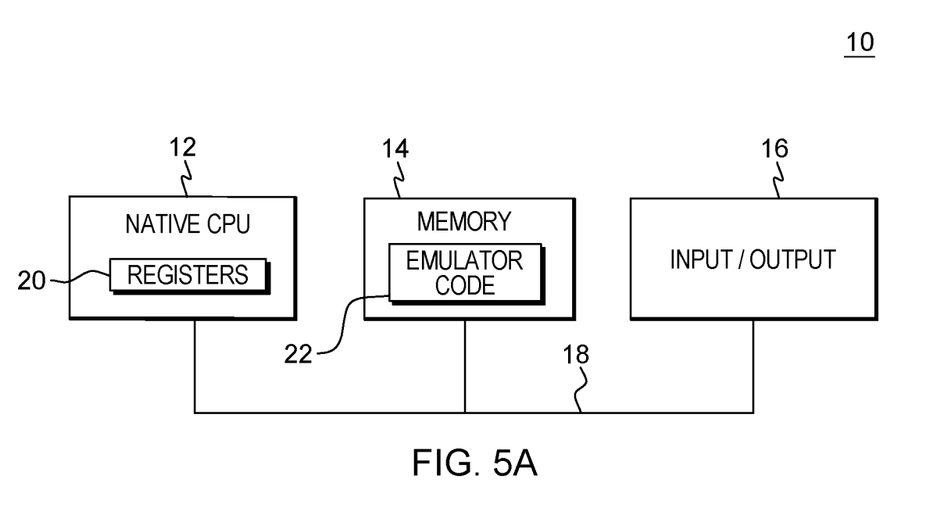
FIG. 5A depicts another example of a computing environment to incorporate and/or use one or more aspects of the present invention.

Another example of a computing environment to incorporate and use one or more aspects of the present invention is described with reference to FIG. 5A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 5B:
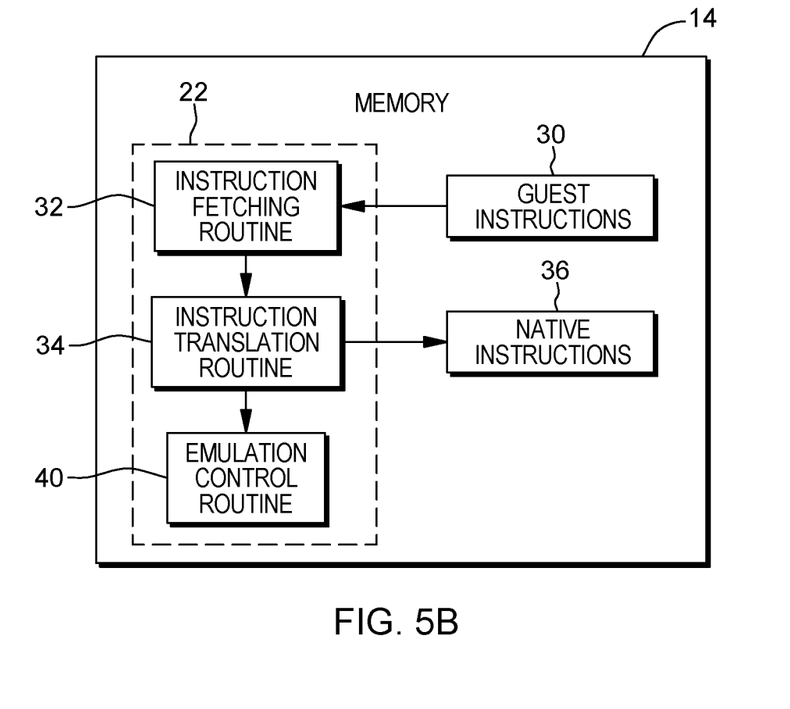
FIG. 5B depicts further details of the memory of FIG. 5A, in accordance with one or more aspects of the present invention.

Further details relating to emulator code 22 are described with reference to FIG. 5B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to perform analysis and to transform a loop for early exit, and/or to perform one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
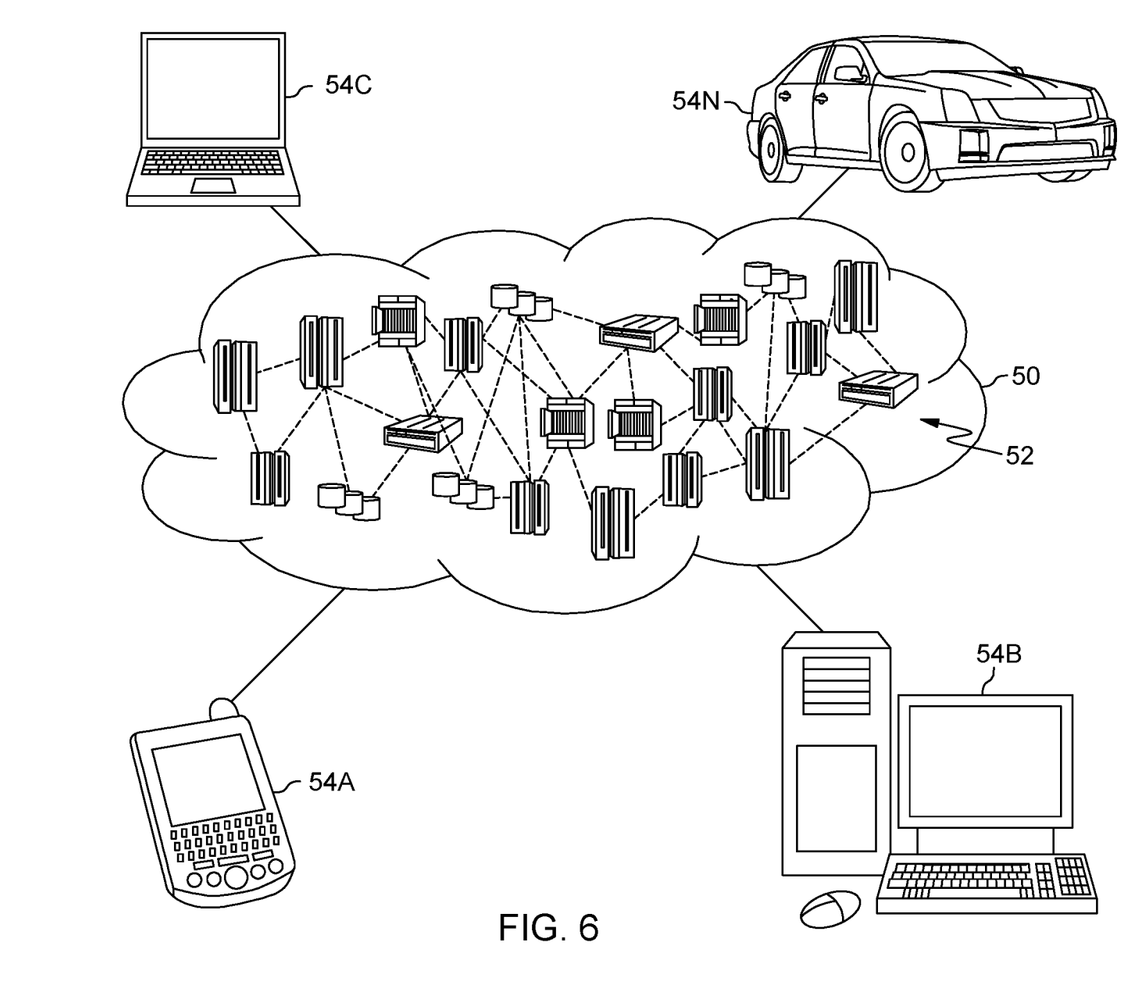
FIG. 6 depicts one embodiment of a cloud computing environment, in accordance with one or more aspects of the present invention.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
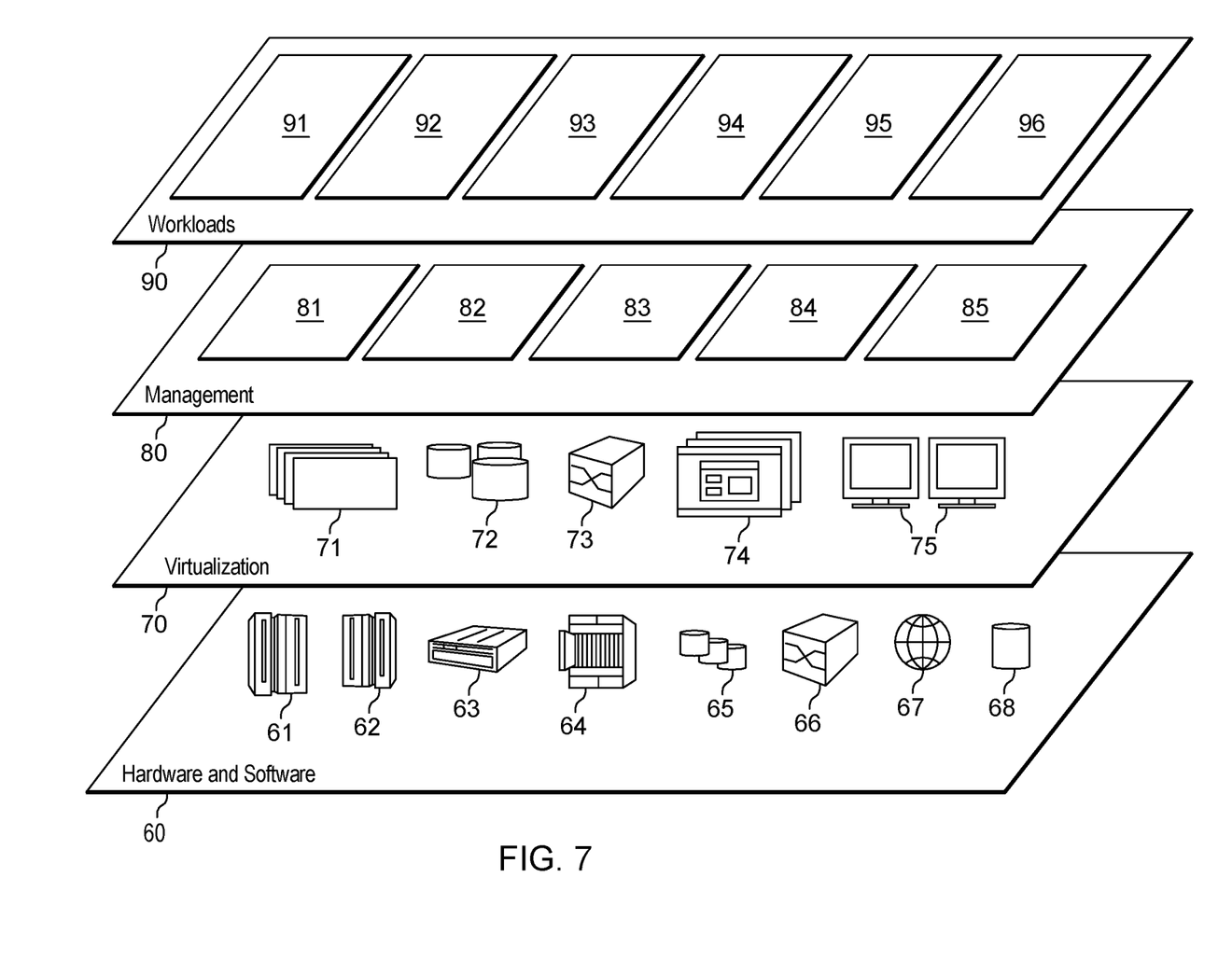
FIG. 7 depicts one example of abstraction model layers, in accordance with one or more aspects of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and early exit transformation processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of intermediate representations, early exit indications and/or techniques may be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium and program instructions collectively stored on the at least one computer readable storage medium to perform a method comprising:
   determining, using a compiler, whether iterating of a loop within computer code reaches a fixed point of processing, the fixed point of processing being predefined; and
   inserting, using the compiler, at least one early exit into the loop, based on the compiler determining that the iterating of the loop reaches the fixed point of processing, the inserting including adding at least one indication in the loop to perform an early exit of the loop that terminates the loop prior to a last iteration of the loop, wherein the iterating of the loop is complete based on reaching the fixed point of processing and no further iterations relating to the loop are performed.

2. The computer program product of claim 1, wherein the fixed point of processing is one in which there are no observable side effects of the loop.

3. The computer program product of claim 1, wherein the fixed point of processing is one in which a live-out variable of the loop is not to be overwritten with a different value.

4. The computer program product of claim 1, wherein the determining whether the iterating of the loop reaches the fixed point of processing comprises determining whether a side effect is observable for the loop, wherein based on the side effect being observable for the loop, the iterating of the loop does not reach the fixed point of processing.

5. The computer program product of claim 4, wherein the determining whether the side effect is observable for the loop comprises determining whether there is an instruction in the loop that potentially has one or more side effects, wherein based on there being the instruction that potentially has the one or more side effects, the side effect is observable for the loop.

6. The computer program product of claim 1, wherein the determining whether the iterating of the loop reaches the fixed point of processing comprises determining whether a live-out variable is to be overwritten with a different value, wherein based on determining that the live-out variable is to be overwritten with the different value, the iterating of the loop does not reach the fixed point of processing.

7. The computer program product of claim 1, wherein the determining whether the iterating of the loop reaches the fixed point of processing comprises determining whether live-out variables of the loop are candidates for transforming the loop to include the at least one indication to exit the loop prior to the last iteration.

8. The computer program product of claim 7, wherein the determining whether a live-out variable of the live-out variables of the loop is a candidate for transforming the loop includes using state analysis of the live-out variable to determine whether a state of the live-out variable is to transition to a not-a-candidate state, wherein the live-out variable is a candidate for transforming the loop based on the live-out variable not transforming to the not-a-candidate state.

9. The computer program product of claim 1, wherein the including the at least one indication comprises adding, using the compiler, a break in the loop subsequent to the fixed point of processing.

10. The computer program product of claim 1, wherein the loop reaches the fixed point of processing based on there being no observable side effects of the loop and one or more live-out variables of the loop are in a state that is a candidate for transforming the loop.

11. A computer system for facilitating processing within a computing environment, the computer system comprising:
   a memory; and
   at least one processor in communication with the memory, wherein the computer system is configured to perform a method, said method comprising:
      determining, using a compiler, whether iterating of a loop within computer code reaches a fixed point of processing, the fixed point of processing being predefined; and
      inserting, using the compiler, at least one early exit into the loop, based on the compiler determining that the iterating of the loop reaches the fixed point of processing, the inserting including adding at least one indication in the loop to perform an early exit of the loop that terminates the loop prior to a last iteration of the loop, wherein the iterating of the loop is complete based on reaching the fixed point of processing and no further iterations relating to the loop are performed.

12. The computer system of claim 11, wherein the fixed point of processing is one in which there are no observable side effects of the loop.

13. The computer system of claim 11, wherein the fixed point of processing is one in which a live-out variable of the loop is not to be overwritten with a different value.

14. The computer system of claim 11, wherein the determining whether the iterating of the loop reaches the fixed point of processing comprises determining whether a side effect is observable for the loop, wherein based on the side effect being observable for the loop, the iterating of the loop does not reach the fixed point of processing, and wherein the determining whether the side effect is observable for the loop comprises determining whether there is an instruction in the loop that potentially has one or more side effects, wherein based on there being the instruction that potentially has the one or more side effects, the side effect is observable for the loop.

15. The computer system of claim 11, wherein the determining whether the iterating of the loop reaches the fixed point of processing comprises determining whether live-out variables of the loop are candidates for transforming the loop to include the at least one indication to exit the loop prior to the last iteration, and wherein the determining whether a live-out variable of the live-out variables of the loop is a candidate for transforming the loop includes using state analysis of the live-out variable to determine whether a state of the live-out variable is to transition to a not-a-candidate state, wherein the live-out variable is a candidate for transforming the loop based on the live-out variable not transforming to the not-a-candidate state.

16. A computer-implemented method of facilitating processing within a computing environment, the computer-implemented method comprising:
   determining, using a compiler, whether iterating of a loop within computer code reaches a fixed point of processing, the fixed point of processing being predefined; and
   inserting, using the compiler, at least one early exit into the loop, based on the compiler determining that the iterating of the loop reaches the fixed point of processing, the inserting including adding at least one indication in the loop to perform an early exit of the loop that terminates the loop prior to a last iteration of the loop, wherein the iterating of the loop is complete based on reaching the fixed point of processing and no further iterations relating to the loop are performed.

17. The computer-implemented method of claim 16, wherein the fixed point is one in which there are no observable side effects of the loop.

18. The computer-implemented method of claim 16, wherein the fixed point of processing is one in which a live-out variable of the loop is not to be overwritten with a different value.

19. The computer-implemented method of claim 16, wherein the determining whether the iterating of the loop reaches the fixed point of processing comprises determining whether a side effect is observable for the loop, wherein based on the side effect being observable for the loop, the iterating of the loop does not reach the fixed point of processing, and wherein the determining whether the side effect is observable for the loop comprises determining whether there is an instruction in the loop that potentially has one or more side effects, wherein based on there being the instruction that potentially has the one or more side effects, the side effect is observable for the loop.

20. The computer-implemented method of claim 16, wherein the determining whether the iterating of the loop reaches the fixed point of processing comprises determining whether live-out variables of the loop are candidates for transforming the loop to include the at least one indication to exit the loop prior to the last iteration, and wherein the determining whether a live-out variable of the live-out variables of the loop is a candidate for transforming the loop includes using state analysis of the live-out variable to determine whether a state of the live-out variable is to transition to a not-a-candidate state, wherein the live-out variable is a candidate for transforming the loop based on the live-out variable not transforming to the not-a-candidate state.

* * * * *